United States Patent [19]

Maier

[11] Patent Number: 4,938,641
[45] Date of Patent: Jul. 3, 1990

[54] PARTING TOOL

[75] Inventor: Johann Maier, Pflach, Austria

[73] Assignee: Schwarzkopf Development Corporation, New York, N.Y.

[21] Appl. No.: 220,603

[22] Filed: Jul. 18, 1988

[30] Foreign Application Priority Data

Jul. 22, 1987 [AT] Austria ............................... A 1854/87

[51] Int. Cl.⁵ ............................................. B23P 15/28
[52] U.S. Cl. ..................................... 407/110; 407/66; 407/101; 407/104
[58] Field of Search .......... 407/110 OR, 66 X, 101 X, 407/102, 103, 104 X

[56] References Cited

U.S. PATENT DOCUMENTS 2,964,833 12/1960 Novkov ............................... 407/107
3,815,454 6/1974 Knott ................................... 407/101

Primary Examiner—Frederick R. Schmidt
Assistant Examiner—Lawrence Cruz

[57] ABSTRACT

A parting tool is provided having a tool shank and an interchangeable blade support connected thereto. The blade support is equipped with a blade attachment of blade. The blade support makes contact along one side thereof with a broad-side of the tool shank. The blade support has narrow sides which are guided, at least on sections, by two guide surfaces of the tool shank typically disposed on flanges. Flat contact surfaces on said flanges perpendicularly disposed in relation to the broad side of the tool shank butt against two corresponding counter guide surfaces on said blade support and are pressed against each other by clamping means such as longitudinally off-set screws. In comparison with earlier parting tools used for the same applications, the parting tools of the invention can be made smaller in overall height and provide extremely stable connection between the blade support and the tool shank, thereby greatly reducing rattling and vibrations during normal cutting operations.

5 Claims, 1 Drawing Sheet

PARTING TOOL

FIELD OF THE INVENTION

The present invention relates to parting tools. More particularly, the present invention relates to parting tools having a tool shank and a blade support adapted to be interchangeable on said tool shank. Still more particularly, the present invention relates to parting tools having a tool shank and an interchangeable blade support wherein said tool shank and said blade support are provided with guiding surfaces and flat contact surfaces to provide a parting tool of short vertical dimension which is sturdy against vibration.

BACKGROUND OF THE INVENTION

Patent specification No. DE-OS 34 34 653 discloses a parting tool having a knife-shaped blade support which is guided along a dovetail guide in sliding manner in an extended lateral recess of the tool shank. By pressing together the spring-tensioned clamping strips of the tool shank which butt on both sides of the blade support, the blade support in that patent is clamped in the desired position. One drawback of this parting tool is that the minimum dimension of the knife-shaped blade support (determined by the cutting force) must be maintained vertically over the entire length of the blade support because the blade support is braced exclusively by the parallel clamping strips. Accordingly, both clamping strips must be of fixed dimension in order to effect sufficient clamping and bracing of the blade support. This can result in a relatively large parting tool height. The tool of this patent, because of its height and the attendant mounting problems, cannot be used in many machine tools. In addition, the length of the Parallel guide of the knife-shaped blade support in the tool shank of this patent can not be less than a certain dimension in order to assure the adequate bracing of the blade support against the cutting force. As a result, a relatively long tool shank length is a characteristic for this type of parting tool.

Austrian Patent specification No. DE-PS 22 50 332 discloses a parting tool whose blade support has a laterally projecting clamping part guided into a lateral recess of the tool shank along parallel guide surfaces which extend in the direction of the longitudinal axis of the tool. The lower guide surface of the tool shank of that patent verges into a contact surface which is vertically positioned with respect to, and extends to the bottom side of, the tool shank. A segment of the blade support of that patent butts against the contact surface. The segment is elongated in a downward direction at the point it connects to the laterally projecting clamping part. The blade support of the patent is secured to the tool shank by screws and the the blade support does not press directly against the contact surface. The downward elongated section of the blade support of that patent might actually improve the bracing of the blade support, thereby enabling the parallel guide of the blade support to be shortened somewhat. However, because the blade support does not press directly up against the contact surface, tilting of the blade support may occur, such that the blade support-tool shank connection is not sufficiently strong and may produce vibrations and rattling. This limits the use of this type of support. Generally, parting tools of this kind are only useful for "cutting in" operations (rather than "cutting off" operations). The industry sometimes refers to "cutting in" operations as "punching in cutting" or plunge cutting. Typically, such operations are for cutting grooves. A common phrase used by the industry for "cutting off" operations is "parting." The present invention can be used for both cutting in and cutting off operations. U.S. Pat. No. 3 934 320 also discloses a parting tool of this type.

U.S. Pat. No. 2 964 833 discloses a parting tool whose knife-shaped blade support makes contact at the broadside thereof, against a side of the tool shank. The narrow sides of the knife-shaped support are guided by two opposing guide surfaces of the tool shank. The lower guide surface has a flat contact surface which is vertical with respect to the knife-shaped support and the side of the tool shank. A correspondingly shaped countersurface makes contact against this contact surface. The blade support is pressed directly against the flat contact surface by means of slotted flat-head screws. However, even with this kind of parting tool the connection between the knife-shaped blade support and tool shank is not stable for many applications.

OBJECTS OF THE INVENTION

Accordingly, it is an object of the present invention to provide a parting tool having an interchangeable blade support which can be made small in overall height, provide a firm attachment for the blade support, and can be used for a wide range of applications.

It is another object of the invention to provide a parting tool with an interchangeable blade attachment having excellent stability so that rattling and vibrations are minimized under normal cutting conditions.

It is still another object to provide a parting tool which can be used to equal advantage for both cutting in (e.g., cutting grooves) and cutting-off operations.

SUMMARY OF THE INVENTION

The parting tools of the invention have a tool shank and a blade support, said blade support making contact along a broad side of said tool shank, said tool shank having first and second flanges disposed therein, said first flange defining a first guide surface and having a first flat contact surface bordering approximately perpendicularly to said first guide surface and said broadside of said tool shank, said second flange defining a second guide surface and having a second flat contact surface bordering approximately perpendicularly to said second guide surface and said broadside of said tool shank, said blade support having a first narrow side which contacts said first guide surface of said first flange for guiding said blade support onto said tool shank, said blade support having a second narrow side which contacts said second guide surface of said second flange for guiding said blade support onto said tool shank, said blade support having first and second flat blade support contact surfaces for contacting said first and second flat contact surfaces on said flanges of tool shank, and clamping means for originating a prestress whereby said blade support is pressed against said shank at said contact surfaces of said shank and said blade support.

DESCRIPTION OF THE INVENTION

According to the invention a second guide surface which is nearly perpendicular with respect to the broadside of the tool shank is disposed on a flange which also has a flat surface which butts against a corresponding countersurface on the blade support and is held in place by pretensioned clamping means.

Because each of the guide surfaces of the invention verge upon a flat contact surface, the blade support can be designed to minimal heights, determined by the cutting pressure expected. Because part of the cutting force is absorbed by the flat contact surfaces, the remaining portion of the blade attachment or blade support can be designed to lower heights, such that decreased overall height and, with it, an expanded scope of applications on various machine tools can be achieved.

By virtue of the parting tool configuration made possible by the invention, it is possible to create a universal tool system which can advantageously be adapted to parting tools for many applications. This tool system, by utilizing different tool shanks and different blade supports, or blade attachments, can be used for nearly all cutting applications such as cutting-off (parting) and cutting-in (e.g., cutting grooves) for interior, exterior and surface processing, with, e.g., varying cutting-in widths and depths. Because the blade attachment can be directly secured to the tool shank without the need for a blade support, interior cutting-in operations can be performed even within very small diameter ranges.

According to one embodiment of the parting tool of the invention, the guide surfaces can be parallel to each other and butt, respectively, against flat contact surfaces at the end of the guide surfaces which face the cutting edge. In this configuration both flat contact surfaces need not lie in the same plane.

Inasmuch as the flat contact surfaces can extend to the end of the respective guide surface facing the cutting edge, fabrication of the tool shank recess to receive the blade attachment or the blade support presents little or no problem. Fabrication of the blade attachment or blade support is possible because the tolerances of the guide surfaces and the tolerances of the flat contact surfaces are independent of each other.

Because the flat contact surfaces need not lie in the same plane, that is, they can be offset from each other in the longitudinal direction of the guide surfaces, sufficient room is made available to easily connect the blade attachment, or blade support, to the tool shank, to provide room and access for devices for clamping the blade attachment within the blade support.

In another embodiment of the parting tool of the invention the guide surfaces can be made to converge toward the end facing away from the cutting edge. In this embodiment, the guide surfaces can converge like wedges toward the end facing away from the cutting edge. In this way, it is possible to adjust the blade attachment or blade support and shank recess in such a way that the blade attachment, or blade support, upon being merely inserted into the tool shank, does not make contact with the flat contact surfaces and will only do so when the blade attachment or blade support is prestressed in the direction of the flat contact surfaces. By virtue of this configuration, a particularly smooth connection can be accomplished between the tool shank and blade attachment, or blade support.

One drawback in this latter design embodiment is that the tolerance of the guide surfaces and the flat contact surfaces are interdependent, making fabrication of the tool costlier. But this increased cost may be overcome by the above stated advantages this embodiment offers.

In a further embodiment of the parting tool of the invention, the guide surfaces can be parallel to each other and one guide surface can make contact with a flat contact surface at the end which faces the cutting edge. The other guide surface can make contact with a flat contact surface at the end which faces away from the cutting edge, each making contact at a flat contact surface which is vertically disposed with respect to matching guide surfaces. In this manner a still further improved bracing of the blade insert or blade support on the tool shank can be provided.

The parting tool can be advantageously designed so that the blade support and tool shank connection is effected by slotted flat-head screws, wherein the longitudinal axes of the tapholes in the tool shank and the longitudinal axes of the countersunk bores in the blade support are offset from one another in such a way that when the slotted flat-head screws are tightened, the countersurfaces of the knife-shaped blade attachment or blade support are pressed against the flat contact surfaces tightly.

The invention is described in greater detail with reference to the following drawing.

DETAILED DESCRIPTION OF THE INVENTION

Figure 1:
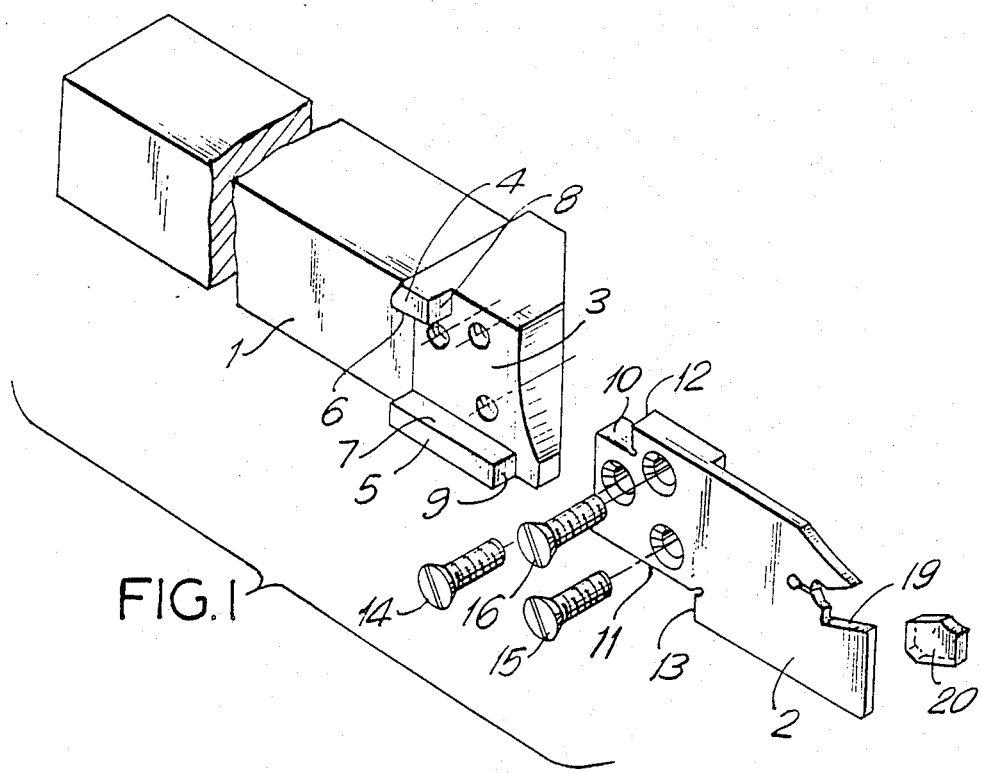
FIG. 1 shows one preferred embodiment of a parting tool according to the invention wherein the tool shank and blade support are shown separated in perspective view.

FIG. 1 shows a parting tool according to the invention, comprising of a tool shank 1 with two laterally disposed, opposing flanges 4 and 5 at one end thereof which receive a knife-shaped blade support 2. The knife-shaped blade support 2 is provided with a wedge-shaped recess 19 for the self-clamping mounting of a wedge-shaped blade support 20, and makes contact at its broadside with the side wall 3 of the tool shank 1. It is connected to the tool shank 1 by slotted flat-head screws 14, 15 and 16. The flanges 4 and 5 of the tool shank 1 are provided with guide surfaces 6, 7 which, respectively, are disposed perpendicularly to a broadside of tool shank 1 shown as wall 3. The guiding surfaces 6 and 7 are parallel to each other. The segments 10 and 11 of the narrow sides of blade support 2 are guided by guide surfaces 6 and 7. Flanges 4 and 5 also define flat contact surfaces 8 and 9 which extend perpendicularly from wall 3 and are also perpendicular to respective guide surface 6 and 7. Upper flange 4 is shorter than lower flange 5, so that flat contact surfaces 8 and 9 are offset from each other in the longitudinal direction of the tool shank. Sufficient space is thereby created enabling the blade support 2 to be connected to tool shank 1 by means of three triangularly disposed slotted flat-head screws 14, 15 and 16. The distances of the longitudinal axes of the tapholes in the tool shank from the flat contact surfaces 9 are slightly different from the distances of the longitudinal axes of the countersunk bores in the blade support 2 from countersurface 13. By virtue of this offset, countersurfaces 12 and 13 of blade support 2 are pressed against flat contact surfaces 8 and 9 of tool shank 1 when slotted flat-head screws 14, 15 and 16 are tightened.

Figure 2:
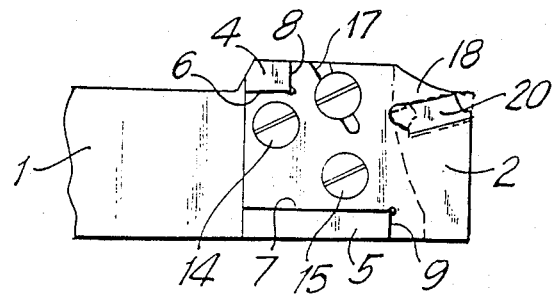
FIG. 2 shows another preferred embodiment of a parting tool according to the invention, in lateral view.

In FIG. 2 another embodiment of a parting tool of the invention is shown. In this embodiment the guide surfaces 6 and 7 of flanges 4 and 5 converge in wedge-shaped fashion toward the end of the tool shank which faces away from blade attachment 20. Blade support 2 is equipped with a reversible blade attachment 20 which is clamped tight via elastic lug 18 of blade support 2. The slotted flat-head screws 14 and 15 function as they do in the parting tool shown in FIG. 1 to press blade support 2 against flat contact surfaces 8 and 9. Screw 16 functions to expand slot 17 of blade support 2 and thereby bringing about the clamping of the reversible cutting plate by the lug 18 of blade support 2. In this way solid clamping of blade attachment 20 and constant positioning of the cutting edge is achieved. A configuration of blade support 2 of this kind is preferably used during cutting-in operations.

Figure 3:
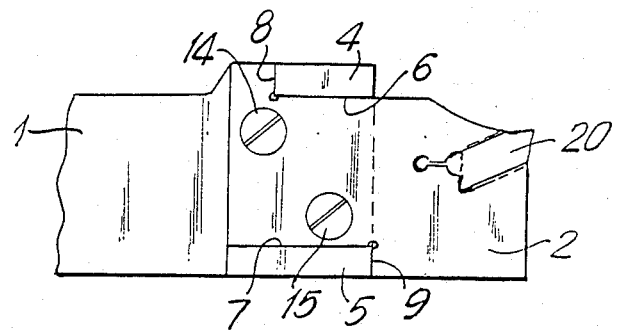
FIG. 3 shows a third preferred embodiment of a parting tool according to the invention, in lateral view.

FIG. 3 shows a third embodiment of a parting tool according to the invention. In this configuration flanges 4 and 5 are again of the design having parallel guide surfaces 6 and 7. Flange 4 is again shorter than flange 5 and has the flat contact surfaces at the end of the flange 4 which face away from blade attachment 20 while flange 5 has the flat contact surface 9 at the end which faces toward blade attachment 20. The longitudinal axes of the tapholes in the tool shank and those of the countersunk holes in the blade support 2 are offset from one another in such a way that when the slotted flat-head screw 14 is tightened, the countersurface of blade support 2 is pressed against flat contact surface 9.

What is claimed is:

1. A parting tool comprising a tool shank and blade support or attachment, said tool shank comprising a sidewall with a plurality of opendings and offset first and second laterally flanged surfaces having flat contact surfaces and flat guide surfaces which extend perpendicularly from said sidewall and perpendicularly to each other, said blade support or attachment comprising a front and back broad side and top and bottom narrow sides having countersurfaces and guide segments and a plurality of mating openings; the guide segment of said top narrow side of said blade support or attachment contacting the flat guide surface of said first flanged surface of said tool shank, the guide segment of said bottom narrow side of said blade support or attachment contacting said flat guide surface of said second flanged surface of said tool shank, and clamping means cooperating with said plurality of openings for joining said tool shank and said blade support or attachment in a prestressed relationship wherein the countersurface of said top narrow side is pressed against said flat contact surface of said first flanged surface, the countersurface of said bottom narrow side is pressed against said flat contact surface of said second flanged surface and the back broad side of said blade support being supported by said tool shank in contact with the sidewall thereof.

2. A parting tool, according to claim 1, wherein said clamping means comprises, slotted flat head screws, a plurality of openings in said tool shank having longitudinal axis, a plurality of mating openings in said blade support or attachment having countersunk bores having longitudinal axis for receiving said slotted flat head screws; said longitudinal axis for said plurality of openings and said longitudinal axis for said countersunk bores being off-set so that when said slotted flat head screws are tightened, the first and second flat contact surfaces of said tool shank are firmly pressed against said top and bottom counter surfaces of said blade support or attachment.

3. A parting tool of claim 1, wherein said blade support further comprises a wedge-shaped recess for supporting a wedge-shaped blade attachment.

4. The parting tool of claim 1, wherein said first flat guide surface and said second flat guide surface of said tool shank are parallel and said first flat contact surface and said second flat contact surface of said tool shank do not lie in the same plane.

5. The parting tool of claim 1, wherein said first flat guide surface and said second flat guide surface of said tool shank are not parallel and define planes which converge toward each other in the direction of the tool shank.

* * * * *